United States Patent
Kojima et al.

(10) Patent No.: US 9,100,276 B2
(45) Date of Patent: Aug. 4, 2015

(54) DISTRIBUTION DEVICE, CONTROL METHOD, AND STORAGE MEDIUM

(71) Applicant: Canon Kabushiki Kaisha, Tokyo (JP)

(72) Inventors: Yuji Kojima, Tokyo (JP); Yoichi Matsuyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 13/709,120

(22) Filed: Dec. 10, 2012

(65) Prior Publication Data

US 2013/0166717 A1 Jun. 27, 2013

(30) Foreign Application Priority Data

Dec. 26, 2011 (JP) ................. 2011-282779

(51) Int. Cl.
*G06F 15/173* (2006.01)
*H04L 12/24* (2006.01)
*G06F 3/12* (2006.01)

(52) U.S. Cl.
CPC .............. *H04L 41/00* (2013.01); *G06F 3/1207* (2013.01); *G06F 3/1259* (2013.01); *G06F 3/1288* (2013.01)

(58) Field of Classification Search
CPC ...... G06F 3/127; G06F 3/1259; G06F 3/1288
USPC .................................. 709/223, 224
See application file for complete search history.

(56) References Cited

U.S. PATENT DOCUMENTS

| | | | |
|---|---|---|---|
| 6,985,243 B1* | 1/2006 | Matsueda | 358/1.15 |
| 7,679,762 B2* | 3/2010 | Odagiri | 358/1.15 |
| 2004/0263898 A1* | 12/2004 | Ferlitsch | 358/1.15 |
| 2005/0141013 A1* | 6/2005 | Kikuchi et al. | 358/1.14 |
| 2009/0077169 A1* | 3/2009 | Ikeura et al. | 709/203 |
| 2012/0069381 A1* | 3/2012 | Nagai | 358/1.14 |
| 2012/0133982 A1* | 5/2012 | Nagai et al. | 358/1.15 |
| 2012/0147415 A1* | 6/2012 | Hutchings et al. | 358/1.15 |
| 2012/0194863 A1* | 8/2012 | Oshima et al. | 358/1.15 |
| 2014/0063546 A1* | 3/2014 | Nakayama | 358/1.15 |

FOREIGN PATENT DOCUMENTS

JP  2009-230477 A  10/2009

* cited by examiner

*Primary Examiner* — Mohamed Wasel
(74) *Attorney, Agent, or Firm* — Carter, DeLuca, Farrell & Schmidt, LLP

(57) ABSTRACT

A distribution device receives a registration request of setting information relating to distribution of an event occurring in a print device from a client, registers the setting information, acquires print device information including event information relating to an event occurred in the print device from the print device, determines event information which is a distribution target based on the event information included in the acquired print device information and the registered setting information, distributes the determined event information to the client, and confirms the reception of the event information by the client device to which the event information is to be distributed.

15 Claims, 9 Drawing Sheets

FIG. 2A

```
<?xml version="1.0" encoding="utf-8" ?>
<Status>
 <Printer>
  <DeviceStatus>
   <Summary>Stopped</Summary>
   <Severity>Warning</Severity>
   <Detail>ConsumableEmpty</Detail>
  </DeviceStatus>
  <Consumables>
   <Consumable type="Ink">
    <Item index="1">
     <Color>Cyan</Color>
     <Status>Low</Status>
    </Item>
    <Item index="1">
     <Color>Magenta</Color>
     <Status>Empty</Status>
    </Item>
    <Item index="1">
     <Color>Yellow</Color>
     <Status>Low</Status>
    </Item>
   </Consumable>
  </Consumables>
 </Printer>
 <Job>
  <JobList>
   <JobListItem id="0001" />
   <JobListItem id="0100" />
   <JobListItem id="0231" />
  </JobList>
 </Job>
</Status>
```

FIG. 2B

```
/Status/Printer/Consumable/Consumable[@type='Ink']
```

301

| Client Identifier | NetBIOS Name | IP Address |
|---|---|---|
| ID001 | Client-01 | 172.17.24.001 |
| ID002 | Client-01 | 172.17.24.001 |
| ID003 | Client-02 | 172.17.24.002 |

401

| Print Device Identifier | Print Device Name | Print Device Type | Port |
|---|---|---|---|
| ID001 | AAA01 | Broadsheet | 20000 |
| ID002 | AAA02 | Broadsheet | 20000 |
| ID003 | BBB | A4 Inkjet Type | 20000 |
| ID004 | CCC | A3 Toner Type | 20000 |

| Client Identifier | Print Device Identifier | Status Path |
|---|---|---|
| ID001 | ID001 | /Status/Printer/Consumables/ |
| ID002 | ID002 | /Status/Job/JobList/ |
| : | : | : |

| Client Identifier | Reference Counter | Status Path | Status |
|---|---|---|---|
| ID001 | 1 | /Status/Printer/Consumables/ | (NULL) |
| ID002 | 2 | /Status/Job/JobID/Job0001/Summary | Idle |
| : | : | : | |

| Parameter | Value | Remarks |
|---|---|---|
| 802 Distribution Target Client | All | All: Distribute to all clients<br>Requestor: Distribute only to requesting client |
| | | |
| : | : | : |

| Parameter | Value | Remarks |
|---|---|---|
| Event Accumulation | On | On: Accumulate event,<br>Off: Not accumulate event |
| Event compression rule,<br>Status-specific compression | Off | On: Apply compression rule,<br>Off: Not apply compression rule |
| Event compression rule,<br>Status path type-specific compression | Off | On: Apply compression rule,<br>Off: Not apply compression rule |
| : | : | : |

1201

DISTRIBUTION DEVICE, CONTROL METHOD, AND STORAGE MEDIUM

BACKGROUND OF THE INVENTION

1. Field of the Invention

The present invention relates to a distribution device, a control method, and a storage medium.

2. Description of the Related Art

There have been proposed technologies for distributing an event such as a state of a job from a printer to a client device. Japanese Patent Laid-Open No. 2009-230477 discloses an event notification method in which a multi-function peripheral detects the occurrence of an event in its own peripheral and notifies a client who has been requested monitoring the type of the detected event of the event via multicast or broadcast.

It is contemplated that a distribution device for distributing an event applies the event notification method disclosed by Japanese Patent Laid-Open No. 2009-230477 and distributes an event occurred in a printer to a client device that is making an event distribution request. However, if a distribution device distributes an event to a client device via a broadcast system or a multicast system, the following possibility may arise. In the method, a distribution device does not confirm whether or not a client device making an event distribution request has received an event. Therefore, the client device may fail to receive an event if the client device is not running or the client device cannot communicate with the distribution device.

SUMMARY OF THE INVENTION

The present invention provides a distribution device that distributes an event occurred in a printer to a client device so as to be able to confirm the fact that the client device has received the event.

According to an aspect of the present invention, a distribution device is provided that includes a registration unit configured to receive a registration request of setting information relating to distribution of an event occurring in a print device from a client device and register the setting information; an acquisition unit configured to acquire event information relating to an event occurred in the print device from the print device; a determination unit configured to determine event information which is a distribution target based on the acquired event information and the registered setting information; a distribution unit configured to distribute event information, which has been determined as the distribution target, to the client device; and a confirmation unit configured to confirm the reception of the event information by the client device.

Further features of the present invention will become apparent from the following description of exemplary embodiments with reference to the attached drawings.

BRIEF DESCRIPTION OF THE DRAWINGS

FIGS. 2A and 2B are diagrams illustrating an example of status information.

FIGS. 7A and 7B are diagrams illustrating an exemplary status path management table.

FIG. 8 is a diagram illustrating an exemplary distribution method holding table.

DESCRIPTION OF THE EMBODIMENTS

First Embodiment

Figure 1:
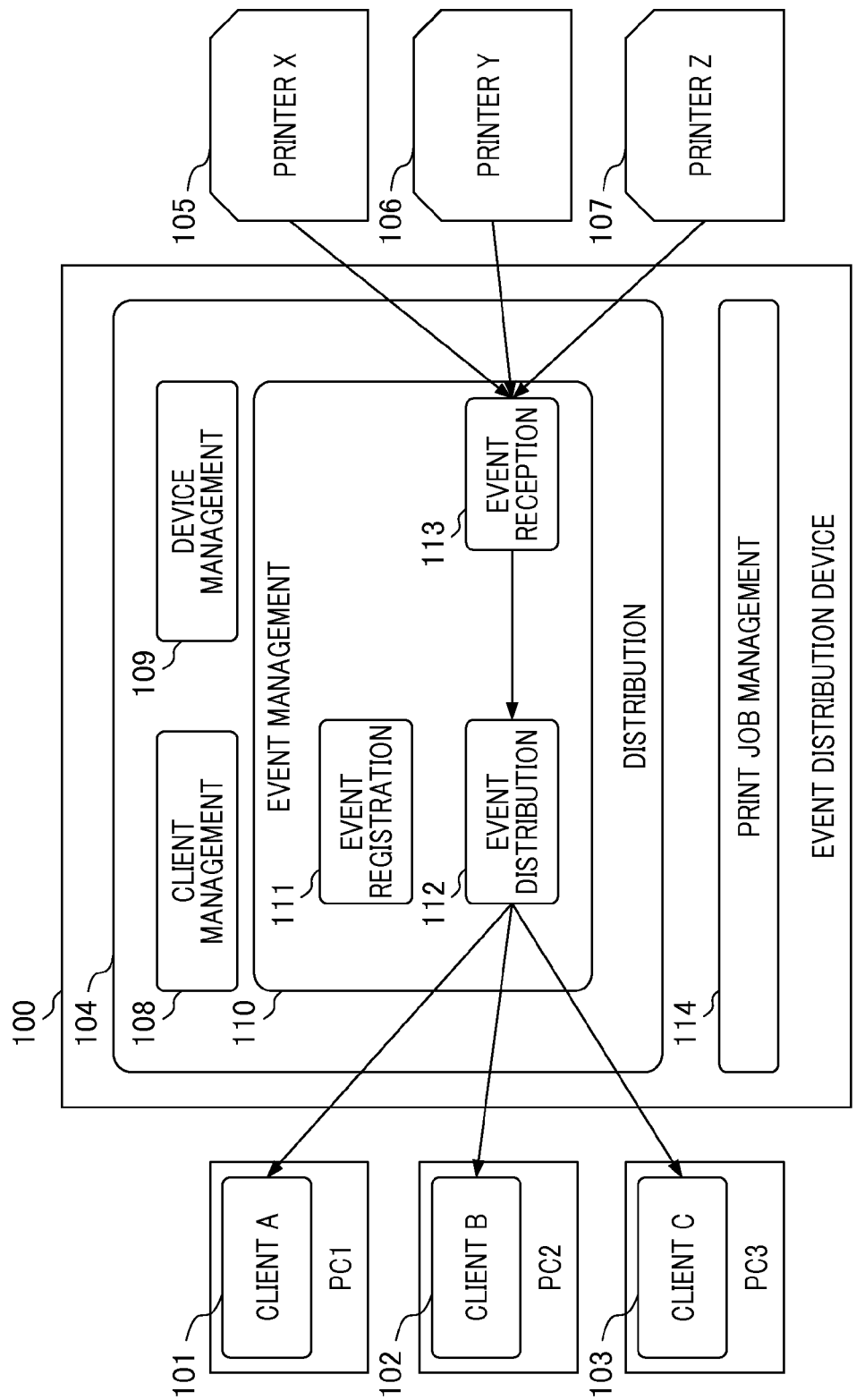
FIG. 1 is a diagram illustrating an example of the system configuration according to a first embodiment.

FIG. 1 is a diagram illustrating an example of the system configuration according to a first embodiment. In FIG. 1, reference numeral 101 denotes a client A, reference numeral 102 denotes a client B, and reference numeral 103 denotes a client C. Each of the clients A, B, and C is a client application (hereinafter referred to simply as "client") that operates on a client device.

An event distribution device 100 is the distribution device of the present embodiment. The event distribution device 100 is arranged as a server device on a network so as to be communicable with a client PC and a printer. A printer X, a printer Y, and a printer Z represented by reference numerals 105, 106, and 107, respectively, are print devices that are managed by the event distribution device 100 and are connected to each other via a network, a USB cable, or the like. In order to be informed of a change in any status or acquire the value of any status, a status path can be registered in each printer.

Figure 13:
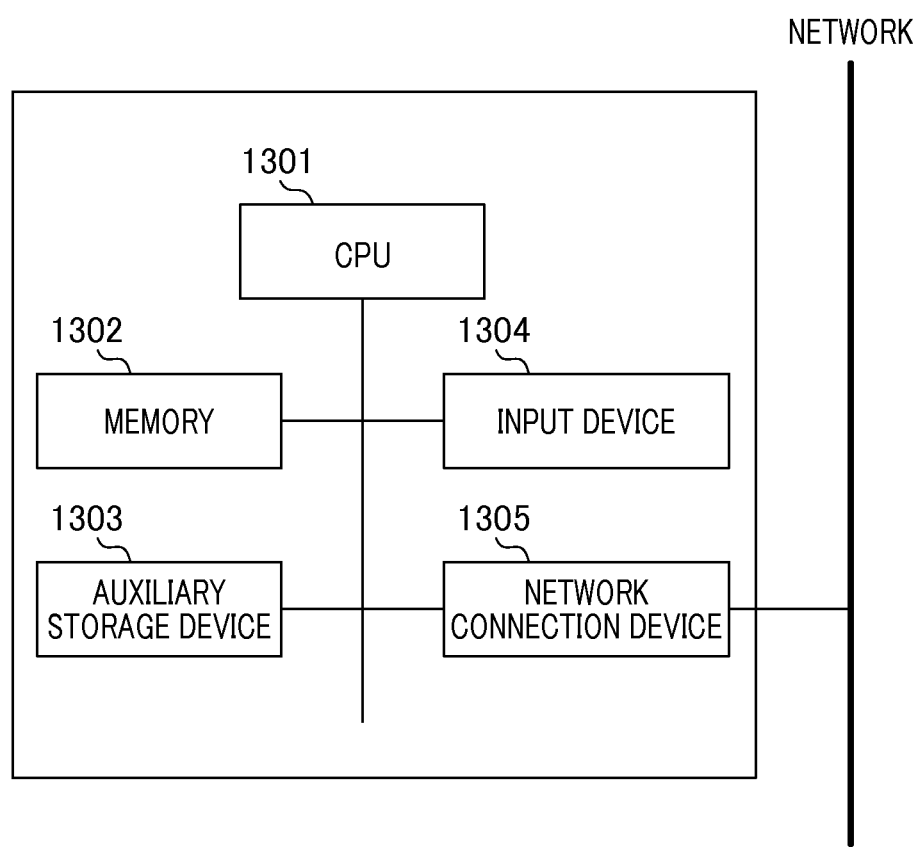
FIG. 13 is a diagram illustrating an example of the hardware configuration of an information processing device to which the present invention is applicable.

FIG. 13 is a diagram illustrating an example of the hardware configuration of an information processing device (the event distribution device 100, i.e., the client PC) to which the present invention is applicable. A CPU 1301 controls the entire units provided in the device. An auxiliary storage device 1303 stores an OS (operating system), a computer program for realizing control processing according to the present invention to be described below, and various data. The computer program stored in the auxiliary storage device 1303 is executed by the CPU 1301 by being expanded on a memory 1302. An input device 1304 is a device that receives an input from a user. A network connection device 1305 is a device that controls reception/transmission of data from/to a network. For the client PC or the like, an output device such as display may also be added.

FIGS. 2A and 2B are diagrams illustrating examples of status information for managing the status of each print device in a printer. As shown in FIG. 2A, status information is stored as data in XML (Extensible Markup Language) format. In order to designate a status that the client wishes to receive a change notification as data to be distributed from among status information, the client designates a status path in a description method in accordance with XPath (XML Path Language). FIG. 2B shows an example of description of a status path. Among the nodes included in the status information shown in FIG. 2A, all the child nodes can be designated by designating a node other than the leaf node.

For example, when a node "/Status/Printer/DeviceStatus" other than a leaf node is designated as a status path, the client can receive the event of a status change from a printer if there is a status change in any one of three leaf nodes exemplified in FIG. 2A:

Summary
Severity
Detail

In other words, the client makes a request for registering event setting information by designating any one node included in status information in XML format including both a leaf node and a node other than the leaf node. In the present embodiment, the event distribution device 100 registers a status path designated by the client as in the printer.

Referring back to FIG. 1, the event distribution device 100 includes modules 108 to 114. A control method performed by the distribution device of the present embodiment is realized by the functions of the modules 108 to 114.

The client management module 108 receives a connection/disconnection request from the clients 101, 102, and 103 and also manages connection to the clients. The device management module 109 is connected to a printer X 105, a printer Y 106, and a printer Z 107 to thereby manage the device connection state. The event management module 110 includes the internal modules 111 to 113 that constitute the event management module 110 itself. Reference numeral 104 shown in FIG. 1 denotes a distribution module that includes the client management module 108, the device management module 109, and the event management module 110.

Also, the job management module 114 is a module that issues a job to each print device. For example, the job management module 114 functions as a print job management module that issues a job to each print device. The event distribution device may also be adapted not to include a job management module.

The event distribution device 100 is implemented as a process being resident in an OS. In the present embodiment, the event distribution device 100 is implemented as a service on the MICROSOFT WINDOWS (registered trademark) OS.

Also, the event distribution device 100 provides an API (application interface) to a client PC. In the present embodiment, the COM (Component Object Model) interface is applied as the API.

<Client Connection>

Next, a description will be given of the flow of the processing in which each client PC is connected to an event distribution device. Firstly, the client 101 generates an instance for identifying itself by using the API provided by the event distribution device 100 to thereby obtain its identifier (client identifier). The subsequent invoking of an API from a client designates the client identifier so that the request can be conveyed to an event distribution device.

An instance generation request is transmitted to the client management module 108 via an API. The client management module 108 issues a new and unique client identifier for each instance generation request and transmits the identifier to the client 101. At this time, the client management module 108 stores the client identifier in a client management table in association with identification information about the client.

Figures 3, 4, 5:
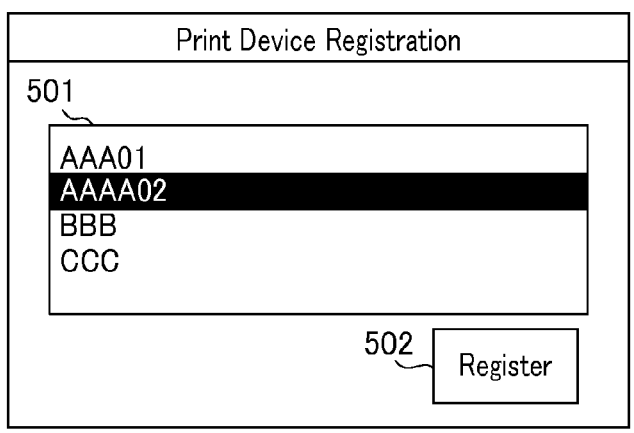
FIG. 3 is a diagram illustrating an exemplary client management table.
FIG. 4 is a diagram illustrating an exemplary print device information list.
FIG. 5 is a diagram illustrating an exemplary dialogue to be displayed on a screen by a client.

FIG. 3 is a diagram illustrating an exemplary client management table. A client management table 301 has data items including client identifier, NetBIOS name, and IP ADDRESS. A single client may also have a plurality of client identifiers.

Next, the client 101 registers a callback event reception object for receiving various status information or an error notification about a print device from the event distribution device 100. The client 101 implements a predetermined interface and registers an event reception object using an event reception object registration API.

<Target Print Device Designation>

After the registration of the event reception object has been completed, the client 101 acquires list information about print devices registered in an event distribution device using a print device list acquisition API. As print device list information, print device information list held by the device management module 109 is transmitted back to the client 101.

FIG. 4 is a diagram illustrating an exemplary print device information list. The event distribution device 100 manages a print information list 401. The event distribution device 100 manages a print device information list as a file or DB (Database) on an OS. When the print device information list is updated, the print device information list may be updated directly from an editor or the like or may be updated from a GUI (Graphical User Interface) by preparing it.

After receiving the print device view list, the client 101 designates a print device for use in the client 101 from the print device list, and acquires the corresponding print device identification information.

FIG. 5 is a diagram illustrating an exemplary dialogue to be displayed on a screen by a client. The user of a client PC designates a print device for use using the dialogue shown in FIG. 5. The user selects a print device for use from among print devices listed on a print device list display section 501 shown in FIG. 5, and depresses a setting button 502. The client 101 invokes a print device instance generation API using print device identification information corresponding to the print device selected by the user as an argument to thereby obtain the identifier of the generated print device instance. The subsequent invoking of an API designates the obtained print device instance identifier (hereinafter referred to as "print device identifier") so that a print device which is targeted for processing corresponding to the API can be designated.

<Event Registration>

When the client 101 needs a notification of the status of a specified print device or a change in status of a print job to be executed by the specified print device, the client 101 registers a path (status path) representing the status using a dedicated API. In this manner, the client 101 makes an event distribution request.

Figure 6A:
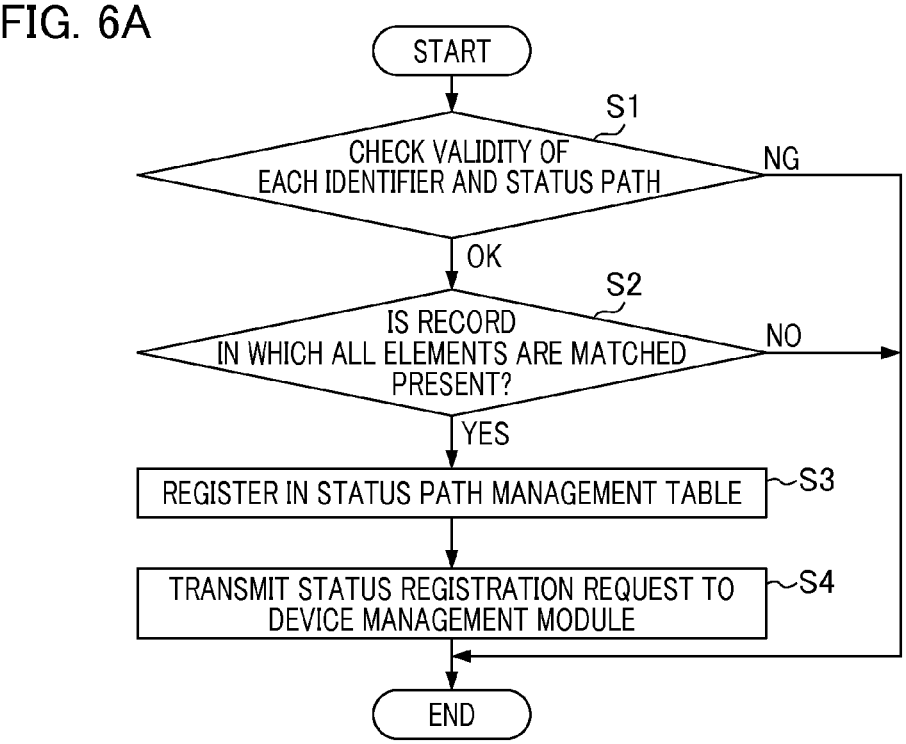
FIGS. 6A and 6B are flowcharts illustrating status path registration processing.
Figure 6B:
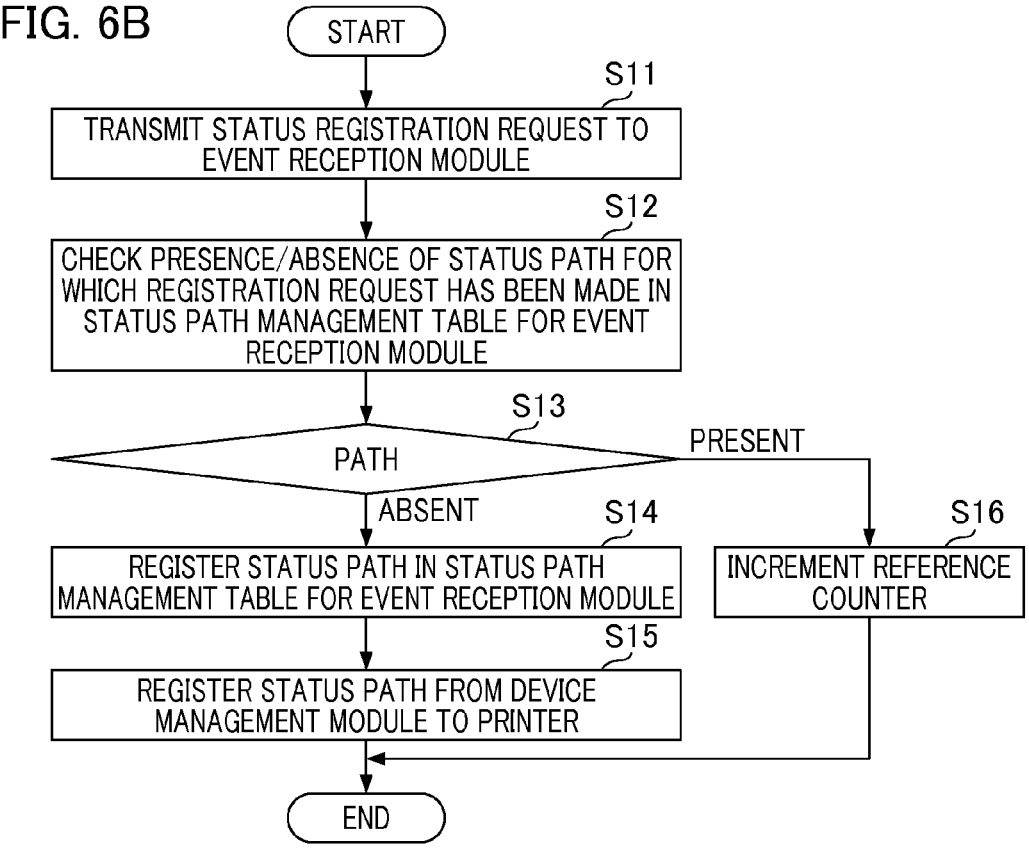

FIGS. 6A and 6B are flowcharts illustrating status path registration processing. When the client 101 invokes an event distribution setting API (makes a status registration request) using a status path as the argument of event distribution setting information, the request is transmitted to the event registration module 111. Event distribution setting information is setting information relating to distribution of an event occurring in a print device. The status registration request is a registration request for event distribution setting information (in this example, status path).

FIG. 6A shows an example of operation processing flow of an event registration module. After checking the content of the status registration request, the event registration module 111 registers the status registration request in a status path management table 701. More specifically, the event registration module 111 checks the validity of each identifier and status path included in the status registration request (step S1). When there is no validity to each identifier and status path (NG in step S1), the process is ended. When there is a validity to each identifier and status path (OK in step S1), the process advances to step S2.

Next, the event registration module 111 determines whether or not a record in which all the elements to be registered, such as identifiers, status paths, and the like included in the status registration request are matched is present in the status path management table 701 (step S2). When there is a record in which all the elements to be registered included in the status registration request are matched in the status path management table 701, the process is ended. When there is no record in which all the elements to be registered included in the status registration request are matched in the status path management table 701, the event registration module 111 registers the elements to be registered in the status path management table 701 (step S3). In other words, the event registration module 111 functions as a setting information registration unit that registers event distribution setting information (in this example, status path) by receiving it from a client device.

FIGS. 7A and 7B are diagrams illustrating an exemplary status path management table. FIG. 7A shows an exemplary status path management table for the event registration module 111. A status path and a print device identifier are registered in the status path management table 701 in association with a client identifier.

Referring back to FIG. 6A, after registering the content of the status registration request in the status path management table 701, the event registration module 111 transmits the status registration request to the device management module 109 (step S4).

Upon receiving the status path registration request from the event registration module 111, the device management module 109 transmits the print device identifier and the status path to the event reception module 113. The event reception module 113 receives an event including a status, a status change event, and an error event of a printer connected to the event distribution device 100. In other words, the event reception module 113 functions as an acquisition unit that acquires event information relating to an event occurred in a print device from the print device. The event reception module 113 has a status path management table for an event reception module, which is used for receiving a status change event.

FIG. 7B shows an exemplary status path management table for an event reception module. A status path, a status, and a print device identifier are registered in a status path management table 702 in association with a client identifier. As in the status path registered in the status path management table 701, the status path registered in the status path management table 702 functions as event distribution setting information.

FIG. 6B shows an example of operation processing flow of an event reception module. Firstly, the event reception module 113 receives a status registration request from the device management module 109, and receives a print device identifier and a status path included in the status registration request (step S11).

Next, the event reception module 113 checks whether or not a status path included in the status registration request is present in the status path management table 702 (step S12). The event reception module 113 determines whether or not a record corresponding to a status path matching the status path included in the status registration request is present in the status path management table 702 (step S13). When a record corresponding to a status path matching the status path included in the status registration request is present in the status path management table 702, the event reception module 113 increments the reference counter of the record by one (step S16). Then, control is transferred back to the device management module 109.

When a record corresponding to a status path matching the status path included in the status registration request is absent in the status path management table 702, the process advances to step S14. Then, the event reception module 113 stores the print device identifier and the status path included in the status registration request as a single record in the status path management table 702 (step S14). After the event reception module 113 sets the value of the reference counter to one, the event reception module 113 transmits the check result obtained in step S12 back to the device management module 109.

Upon receiving a response of the check result, the device management module 109 registers the status path in the printer X 105. In this manner, duplicate status paths can be prevented from being registered in a printer.

In the present embodiment, the event reception module 113 is adapted to receive an event from the printer X 105. However, the device management module 109 may perform polling of a status required for the printer X 105 so as to detect a change in status. Although, in the present embodiment, a description has been given of the printer X 105, the same also applies to the printer Y 106 and the printer Z 107.

<Event Occurrence and Status Reception>

When a status corresponding to the registered status path changes in the printer X 105, a status change notification is sent to the event reception module 113. The status change notification has, for example, the following status distribution rules (i) and (ii).

(i) When the status path registered in the printer X 105 indicates a leaf node and the status indicated by the leaf node changes, the event reception module 113 is informed of the status path and the changed status.

(ii) When the registered status path indicates a node other than a leaf node and the status of any one leaf node linked to the node changes, the event reception module 113 is informed of the status path of the node. In other words, event information acquired by the event reception module 113 has a status path corresponding to the status of a print device or both the status and the status path.

The event reception module 113 that has received a notification of change in the status of the registered printer X 105 updates the corresponding value of the node in status information corresponding to the printer X 105.

Next, the event reception module 113 refers to the status path management table 702 shown in FIG. 7B, and determines whether or not an event distribution module 112 is informed of a change in status. When a status path corresponding to the changed status is present in the status path management table 702, the event reception module 113 notifies the event distribution module 112 of the change in status.

In other words, the event reception module 113 functions as a determination unit that determines event information to be distributed based on event information acquired from a print device and setting information (status path) registered in a status path management table. More specifically, the event reception module 113 determines whether or not the status path included in event information is present in the status path registered in the status path management table 702. When the status path included in event information is present in the status path registered in the status path management table 702, the event reception module 113 determines the event information as the distribution target.

<Event Distribution>

The event distribution module 112 of the event distribution device 100 distributes a status change event, a status, an error, or the like that are data targeted for event distribution. In other words, the event distribution module 112 functions as a distribution unit that distributes event information determined as the distribution target to a client device. More specifically, upon receiving a status change notification from the event reception module 112, the event distribution module 112 refers to a distribution method holding table.

FIG. 8 is a diagram illustrating an exemplary distribution method holding table. A distribution method holding table 801 has data items including parameter, value, and remarks. In this example, a parameter 801 stores a distribution target client 802. The value is the value for the parameter. The remarks store the description of the value for the parameter. In this example, the value "All" for the parameter indicates distribution to all the clients. Also, the value "requesting source" for the parameter indicates distribution only to the client of the requesting source, i.e., the requesting client from which event distribution was requested.

Thus, for example, when the value of the distribution target client 802 is "All", the event distribution module 112 refers to the client management table 301 and distributes a status change event to all the registered clients. At this time, the event distribution module performs event distribution processing for each individual client in parallel, and sequentially distributes an event while confirming that the clients have received an event. Upon receiving event distribution, the client 101 performs status processing.

Also, the value of the distribution target client 802 is "requesting source", the event distribution module 112 refers to the client management table 301 and performs event distribution to the requesting client from which event distribution was requested. In other words, the event distribution module 112 functions as a distribution destination switching unit that executes the following processing. The event distribution module 112 switches the distribution destination to which event information determined as the distribution target is distributed to either all the client devices being connected to an event distribution device or the requesting client device from which registration of event distribution setting information corresponding to the event information was requested.

Upon distributing a status change event, the event distribution module 112 distributes event information to be distributed as well as the client identifier of the requesting client from which event distribution was requested to a client device.

Figure 9:
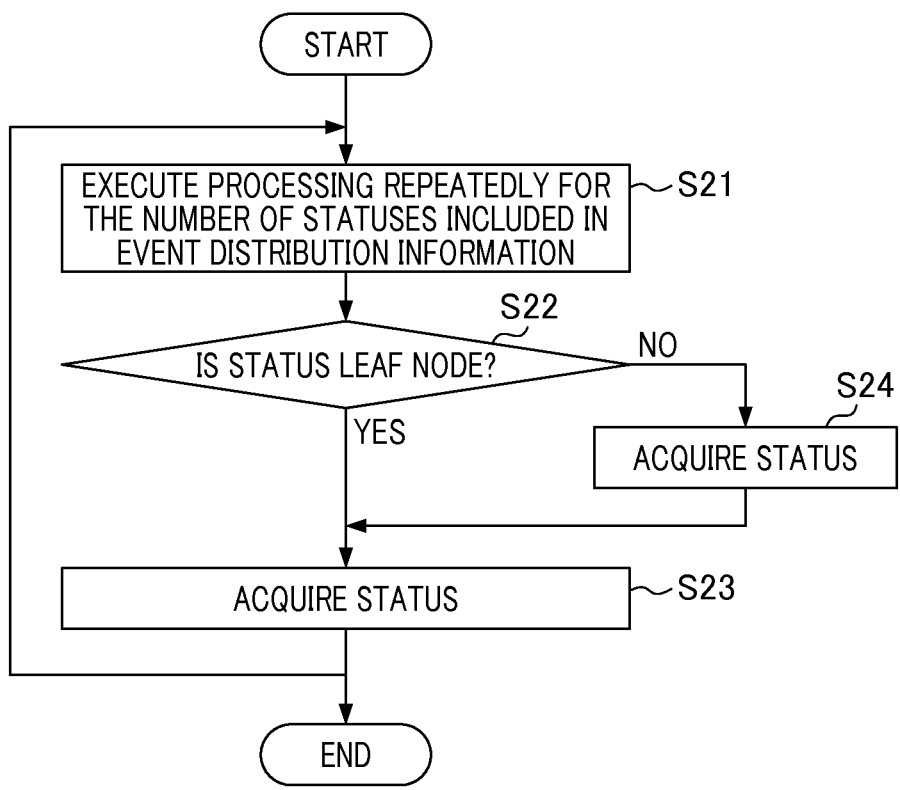
FIG. 9 is a diagram illustrating an example of operation processing performed by a client that receives event distribution.

FIG. 9 is a diagram illustrating an example of operation processing performed by a client that receives event distribution. In this example, a plurality of status paths, i.e., an event for each status path among the status paths is distributed for one event distribution. The client 101 repeatedly executes the following processing for the number of status paths included in event distribution information (step S21).

The client 101 determines whether or not the status path is a leaf node (step S22). If the status path is a node other than the leaf node, the client 101 invokes an API for acquiring the status value and acquires the status value corresponding to the status path (step S24). If the status path is a leaf node, the status value is included in the distributed information itself. Thus, the client 101 acquires the status included in the distributed information itself (step S23). The client 101 updates a display screen using the acquired status.

In the present embodiment, an event may be distributed to a client that does not need an event. Thus, a client can ignore an event not required therefor based on client identifiers included in event information. When a client other than the requesting client from which event distribution was requested receives event distribution, the client that has received the event distribution can perform the following confirmation. In other words, the client that has received the event distribution can confirm that the requesting client from which event distribution was requested has received event distribution based on client identifiers included in event distribution information.

<Print Job Issuance and Print Job Monitoring Settings>

Next, a description will be given of processing in which a client PC issues a print job and receives an event for the print job.

Figure 10:
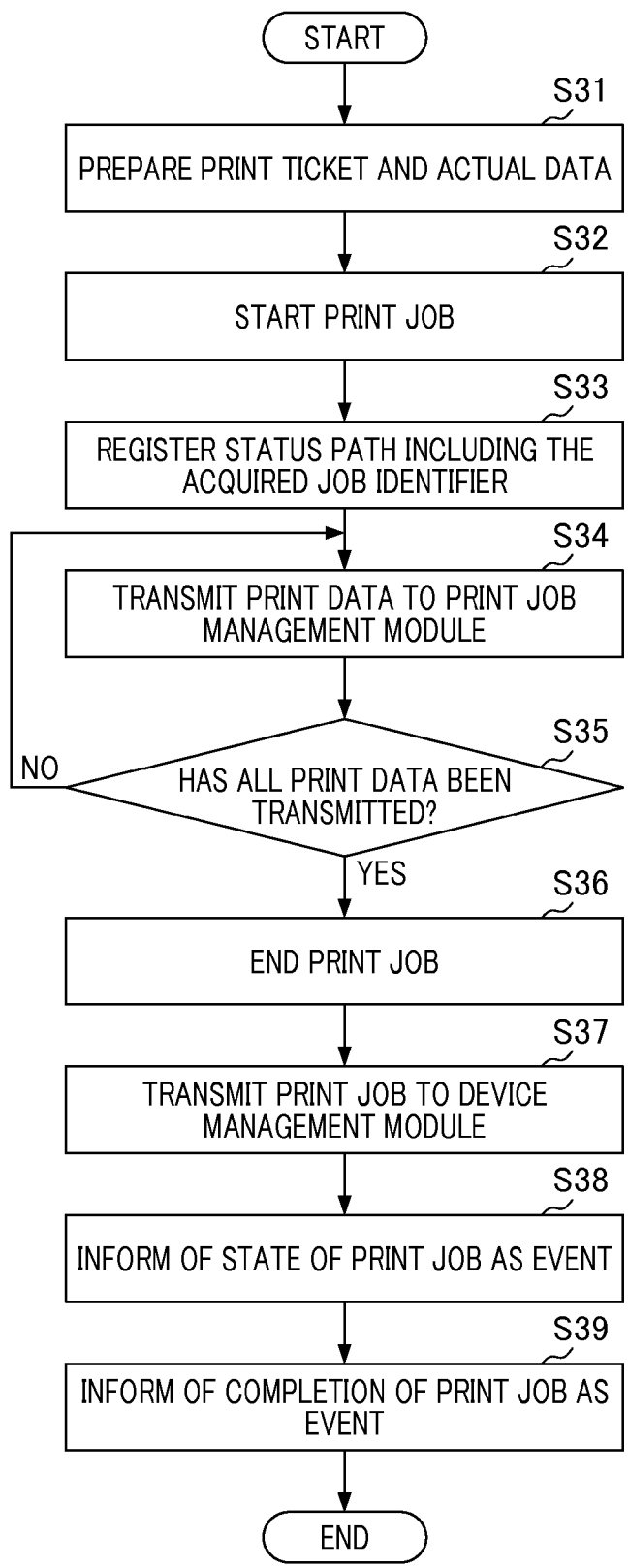
FIG. 10 is a flowchart illustrating an example of job issuance processing and job-state event reception processing.

FIG. 10 is a flowchart illustrating an example of job issuance processing and job-state event reception processing. Firstly, the client 101 prepares a print ticket and actual data that constitute a print job (step S31). The configuration of a print job, the print settings for each page, and the name of actual data are described in the print ticket. Actual data is image data such as JPEG or the like or a PDL file.

Next, the client 101 invokes a print job start API and starts a print job (step S32). For the print job start API, the client 101 designates a client identifier, a print device identifier, and a ticket as inputs to thereby obtain a job identifier for identifying a job as an output. Invoking of the print job start API is processed by the device management module 109 via the print job management module 114 in synchronization with the printer X 105.

Next, the client 101 invokes a status path registration API. Upon invoking the status path registration API, the client 101 designates a status path including the job identifier obtained in step S32 as a status path (step S33). In this manner, the client 101 can receive a change in status of a print job as an event.

Next, the client 101 invokes a print data transmission API. For the print data transmission API, the client 101 designates a client identifier, a print device identifier, a job identifier, a pointer for a region storing actual data, and an actual data size as inputs. In this manner, print data is transmitted to the print job management module 114 (step S34). The print job management module 114 manages invoking of the print data transmission API from the client 101. More specifically, the print job management module 114 manages the invoking using a request queue for each print device to which print data is to be transmitted. The invoking of the print data transmission API from the client 101 ends at a time after print data has been transferred to the print job management module 114.

Next, the client 101 determines whether or not all data required for a print job has been transmitted (step S35). When the client 101 determines that all data required for a print job has been transmitted, the client 101 ends the print job (step S36), and the process advances to step S37. When the client 101 determines that all data required for a print job has not been transmitted, the process returns to step S35.

In step S37, the client 101 invokes a print job end API. For the print job end API, the client 101 designates a client identifier, a print device identifier, and a job identifier as inputs. The print job management module 114 manages the invoking of the print job end API using a request queue for each print device to which print data is to be transmitted. The invoking of the print job end API from the client 101 ends at a time after print data has been transferred to the print job management module 114. In this manner, the client 101 can transmit a print job to the device management module 109.

When the state of a print job changes, the changed state of the print job is distributed from the event distribution device 100 to the client 101 as an event (step S38). When a print job executed by a print device ends, the end of the print job is distributed from the event distribution device 100 to the client 101 as an event (step S39).

Although a description has been given of processing to be executed by the client 101 in FIG. 10, other clients perform the same processing so that a print job can be issued.

<Print Job Control>

After a print job has been issued, a client can control the print job using a print job control API. For the print job control API, the client designates a client identifier, a print device identifier, a job identifier, and a control class as inputs. Examples of control class include canceling, deletion, and the like.

<Monitoring a Print Job in a Job Monitoring Client>

The client C 103 shown in FIG. 1 is a job monitoring client. The job monitoring client monitors the state of a print job issued by another client without issuing a print job by the client itself.

In order to monitor a print job issued by another client (e.g., job issuance client for issuing a print job), the client C 103 executes the flow of processing for connecting to an event distribution device, which has been described in the previous section <Client Connection>.

The client 101 serving as a job issuance client registers the status path of a job in step S33 shown in FIG. 10. The event distribution device 100 distributes the state of a job to all the clients being connected as an event (steps S38 and S39 shown in FIG. 10). In this manner, the client C 103 can receive the event. As described above, the distribution device of the present invention can confirm that a client device from which event distribution was requested has received the event. Thus, the client device can be prevented from failing to receive an event.

<Monitoring a Print Job in a Job Monitoring Client>

Upon receiving job-state event distribution, the client C 103 serving as a job monitoring client takes a job identifier for a job from a status path. Then, the client C 103 executes control of the print job using the taken job identifier. For the print job control API, a client identifier, a print device identifier, and a job identifier are required as inputs. Hereinafter, a description will be given of the processing in which the client C 103 obtains the identifiers.

The client C 103 executes the flow of processing for connecting to an event distribution device, which has been described in the previous section <Client Connection>. In this manner, the client C 103 can obtain a client identifier and print identifiers for all printers. Also, another client executes job issuance processing described with reference to FIG. 10 to thereby register a status path including a job identifier. In this manner, the client C 103 is notified of the status of a job issued by the client as an event. At this time, the client C 103 can obtain the status and the status path. Since the status path includes a job identifier, the client C 103 can take the job identifier by a character string operation.

In the present embodiment, for example, a job identifier may also be adapted to contain a printer identifier. Specifically, the event distribution module 112 distributes event information to a client device together with identification information about a requesting client device from which the registration of event distribution setting information was requested, a printer identifier for a print device from which event information was acquired, and identification information about a job being executed by the print device. In this manner, the client C 103 that has received distribution of job information can specify the printer identifier of the printer that has issued a job by a character string operation. The client C 103 may also be adapted to acquire the list of job identifiers generated during processing through the printer using the printer identifier of printers at regular intervals.

Second Embodiment

Figures 11, 12:
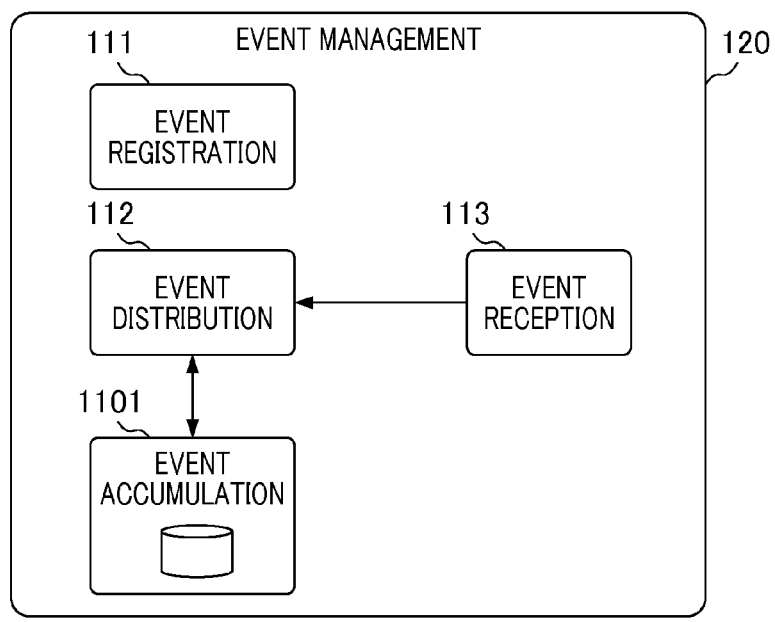
FIG. 11 is a diagram illustrating a part of the configuration of an event distribution device according to a second embodiment.
FIG. 12 is a diagram illustrating an exemplary event compression rule table.

Hereinafter, a description will be given of a second embodiment. In the second embodiment, the event management module 110 includes the event registration module 111, the event distribution module 112, the event reception module 113, and an event accumulation module 1101 as shown in FIG. 11.

The event accumulation module 1101 is a sub-module that accumulates event information distributed by the event distribution module 112. Any one or a combination of the following is applicable as a trigger for accumulating event information by the event accumulation module 1101:

Each occurrence of an event when a client becomes incapable of receiving an event when a predetermined time has elapsed after the last event distribution to a client when the accumulated amount of events in an event queue exceeds a predetermined value The number of events being accumulated When a client cannot receive an event or when a client can receive an event but the frequency of occurrence of events is greater than the frequency of event distribution, the event accumulation module 1101 can accumulate an event(s). For example, the event accumulation module 1101 functions as a confirmation unit that confirms the fact that a client has received event information and accumulates event information if the client cannot receive an event. When the client could receive event information, the event distribution module 112 distributes the accumulated event information to the client.

Upon accumulating events, the event accumulation module 1101 may store events in a memory or may also perpetuate events in database or the like. In this manner, even if the amount of events becomes large, the amount of memory to be consumed can be held within a predetermined capacity. In addition, upon accumulating events in database or the like, the event accumulation module 1101 can hold an event(s) even if the power supply to the data distribution device is stopped.

Note that the event management module 120 may also include an event compression module (not shown). The event compression module functions as a compression unit that executes the following processing. When the event accumulation module 1101 accumulates event information or when the event distribution module 112 distributes event information, the event compression module compresses the event information based on a predetermined compression rule relating to compression of event information.

The event compression module can apply the event compression rule or the event holding rule as described below. For this purpose, the event compression module may also hold the event compression rule table.

(i) Apply a compression rule corresponding to the type of event. For example, the event compression module stores only the last status for a print job state and a printer state but decompresses an error event.

(ii) Change a compression rule for each element type in XML format. For example, when a status path indicating a status is a node other than a leaf node, the event compression module merges status paths together to thereby store the merged status path as one event.

(iii) When a status path indicating a status is a node other than a leaf node, the event compression module acquires the status itself of any one leaf node linked to the node to thereby store the acquired status.

(iv) Apply the compression rule obtained by combining (i), (ii), and (iii).

FIG. 12 is a diagram illustrating an exemplary event compression rule table. An event compression rule table 1201 has data items including parameter, value, and remarks. In this example, the parameter 1201 stores event accumulation, and status-specific compression and status path type-specific compression as event compression rules. The value stores information ("On" or "Off") for switching whether or not the processing stored in the parameter is executed. The remarks store the description of the value for the parameter. The information "On" indicates that the processing stored in the parameter is executed. The information "Off" indicates that the processing stored in the parameter is not executed.

As a trigger for executing compression processing, the event compression module may set any one of the following values as a threshold value so as to execute compression upon exceeding the threshold value.

(i) A time period elapsed after it becomes impossible for a client to receive an event or a time period elapsed from the last event distribution (ii) The amount of event data to be accumulated (iii) The number of accumulated events In the present embodiment, database is used as a unit for storing the event accumulation module. However, any storage unit such as a file can also be used as long as information can be persistently stored therein.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-282779 filed Dec. 26, 2011, which is hereby incorporated by reference herein in its entirety.

What is claimed is:

1. A distribution device comprising:
a registration unit configured to receive a registration request of setting information relating to distribution of an event occurring in a print device from each of one or more client devices and register the setting information;
an acquisition unit configured to acquire event information relating to an event occurred in the print device from the print device;
a determination unit configured to determine event information which is a distribution target based on the acquired event information and the registered setting information;
a distribution unit configured to distribute event information, which has been determined as the distribution target, to a plurality of client devices including a client device different from the one or more client devices that are the registration requesters of the registered setting information; and
a confirmation unit configured to confirm the reception of the event information by the client device.

2. The distribution device according to claim 1, further comprising:
a switching unit configured to switch whether the destination of event information determined as a distribution target is all of client devices, as the plurality of client devices, connected to the distribution device or the one or more client devices that are the registration requesters of the setting information corresponding to the event information.

3. The distribution device according to claim 1, wherein the distribution unit distributes event information determined as the distribution target to a client device together with identification information about the client device which is the registration requester of the setting information corresponding to the event information.

4. The distribution device according to claim 1, wherein the distribution unit distributes event information determined as the distribution target to a client device together with identification information about the client device that is the registration requester of the setting information corresponding to the event information, identification information about a print device from which the event information is acquired, and identification information about a job which is being executed by the print device.

5. The distribution device according to claim 1, further comprising:
an accumulation unit configured to accumulates the event information when the client device to which the event information is distributed is incapable of receiving the event information,
wherein the distribution unit distributes the event information accumulated in the accumulation unit to the client device when the client device to which the event information is distributed is ready to receive the event information.

6. The distribution device according to claim 5, further comprising:
a compression unit configured to compress the event information based on a predetermined compression rule regarding compression of the event information when the accumulation unit accumulates the event information or when the distribution unit distributes the event information.

7. The distribution device according to claim 1,
wherein the setting information has a status path corresponding to the status of a print device,
wherein the event information acquired by the acquisition unit has a status path corresponding to the status of the print device or both the status and the status path, and
wherein the determination unit determines whether or not the status path included in the event information is present in the setting information and determines the event information as the distribution target when the status path included in the event information is present in the setting information.

8. The distribution device according to claim 7,
wherein the client device makes a request for registering the setting information by designating any one node included in status information in XML format including either a leaf node or a node other than the leaf node, and wherein a client device that has received the distribution of the event information determines whether or not the status path included in the event information is either the leaf node or the node other than the leaf node, and acquires a status included in the event information when the status path included in the event information is the leaf node or requests distribution of a status corresponding to the status path to the distribution device when the status path included in the event information is the node other than the leaf node.

9. A method in a distribution device comprising:
receiving a registration request of setting information relating to distribution of an event occurring in a print device from each of one or more client devices and registering the setting information;
acquiring print device information including event information relating to an event occurred in at least the print device from the print device;
determining event information which is a distribution target based on the event information included in the acquired print device information and the registered setting information;
distributing event information, which has been determined as the distribution target, to a plurality of client devices including a client device different from the one or more client devices that are the registration requesters of the registered setting information; and
confirming the reception of the event information by the client device.

10. The method according to claim 9 further comprising:
switching whether the destination of event information determined as the distribution target is all of client devices, as the plurality of client devices, connected to the distribution device or the one or more client devices which are the registration requesters of the setting information corresponding to the event information.

11. The method according to claim 9, wherein event information determined as the distribution target is distributed to a client device together with identification information about the client device that is the registration requester of the setting information corresponding to the event information when the event information is distributed.

12. A non-transitory storage medium on which is stored a computer program for making a computer execute a method in distribution device comprising:
receiving a registration request of setting information relating to distribution of an event occurring in a print device from each of one or more client devices and registering the setting information;
acquiring print device information including event information relating to an event occurred in at least the print device from the print device;
determining event information which is a distribution target based on the event information included in the acquired print device information and the registered setting information;
distributing event information, which has been determined as the distribution target, to a plurality of client devices including a client device different from the one or more client devices that are the registration requesters of the registered setting information; and
confirming the reception of the event information by the client device.

13. A system including a distribution device and a plurality of client devices, wherein the distribution device comprises:
a registration unit configured to receive a registration request of setting information relating to distribution of an event occurring in a print device from each of one or more client devices and register the setting information;
an acquisition unit configured to acquire event information relating to an event occurred in the print device from the print device;
a determination unit configured to determine event information which is a distribution target based on the acquired event information and the registered setting information;
a distribution unit configured to distribute event information, which has been determined as the distribution target, to devices of the plurality of client devices together with identification information about the client device which is the registration requester of the setting information corresponding to the event information; and
a confirmation unit configured to confirm the reception of the event information by the client device,
wherein each of the plurality of client devices comprises:
a reception unit configured to receive the event information and the identification information from the distribution device; and
a control unit configured to process the received event information based on the received identification information and identification information of the client device.

14. The system according to claim 13, wherein the control unit is configured not to perform a display control using the received event information when the received identification information does not correspond to the identification information of the client device.

15. The system according to claim 13, wherein the distribution unit is configured to distribute the event information to the devices including a client device different from the one or more client devices that are the registration requesters of the registered setting information.

* * * * *